Sept. 10, 1940.  G. EGLOFF ET AL  2,214,455
MULTISTAGE CATALYTIC CONVERSION OF HYDROCARBONS
Filed Jan. 30, 1939
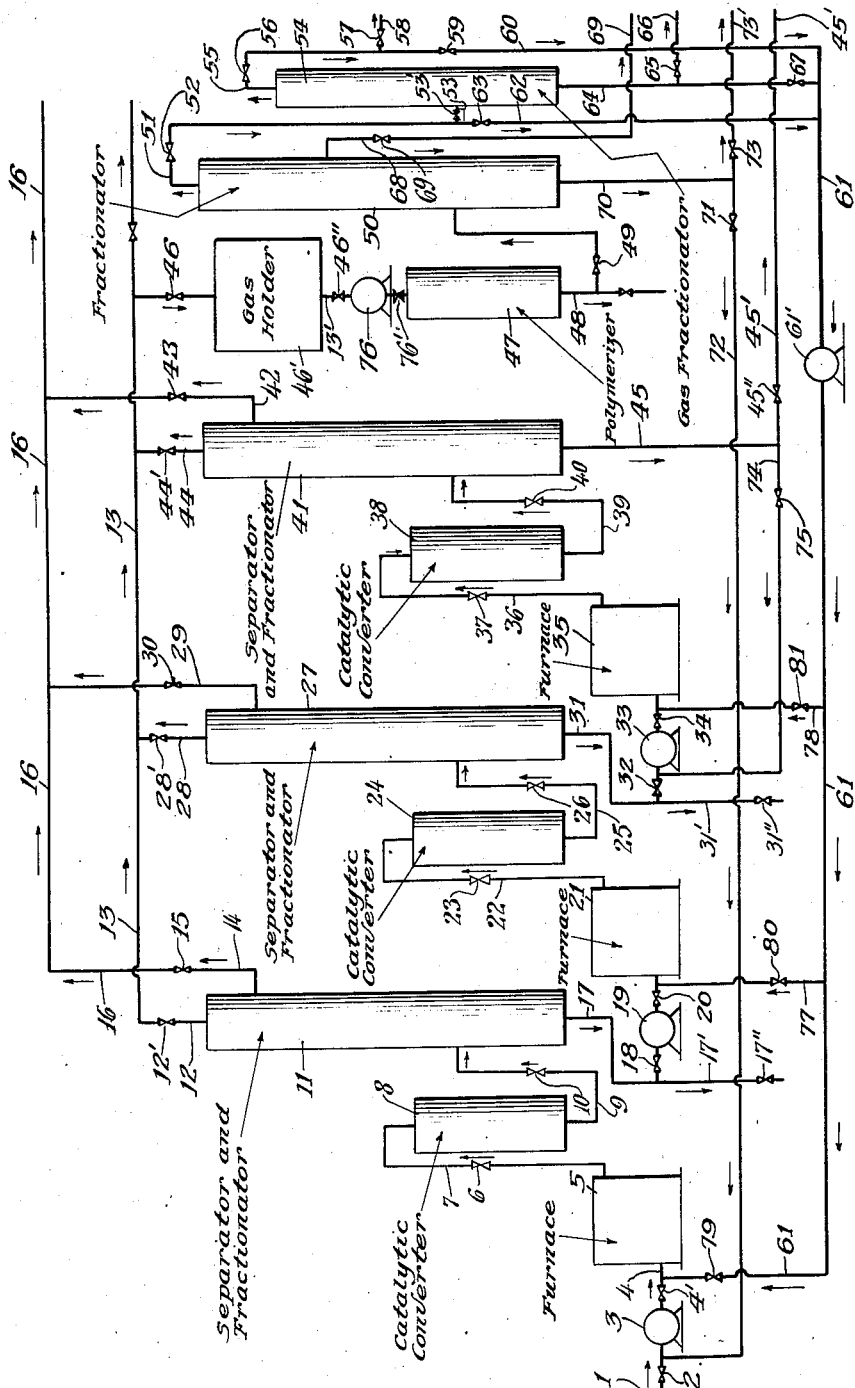
Inventors:
Gustav Egloff,
Charles L. Thomas.
By: Lee J. Gary
Attorney Patented Sept. 10, 1940

2,214,455

UNITED STATES PATENT OFFICE 2,214,455

MULTISTAGE CATALYTIC CONVERSION OF HYDROCARBONS

Gustav Egloff and Charles L. Thomas, Chicago, Ill., assignors to Universal Oil Products Company, Chicago, Ill., a corporation of Delaware Application January 30, 1939, Serial No. 253,629

4 Claims. (Cl. 196—10)

This invention relates to the catalytic conversion of hydrocarbon distillates produced by the distillation of heavy hydrocarbonaceous materials, and more particularly distillates which are vaporizable without substantial decomposition. Although usually from petroleum sources, in certain instances distillates produced from coal tars, shale oils, and the like may be included in the scope of the materials intended for conversion according to our invention.

More specifically, the invention is concerned with the conversion of hydrocarbons by means of specially prepared catalysts which are selective in promoting the formation of high octane number gasoline, as well as gases of a particularly desirable composition.

The art of producing gasoline and gas by thermal cracking of petroleum oils is extensive and because of the large amount of investigation, has been developed to the point where the principles involved are well understood. The catalytic conversion of hydrocarbons, and more specifically catalytic cracking of high-boiling hydrocarbons to produce gasoline and gas is not so well understood. Such deductions as have been made are largely empirical. Discussions of these reactions are, therefore, best confined to facts.

Among the many types of catalysts which have been proposed to assist the thermal conversion of higher boiling distillates into gasoline are certain types which promote as the predominating reaction, the formation of gas rather than gasoline. Such catalysts include the reduced metal catalysts, such as nickel and iron and their ores. These catalysts are furthermore subject to poisoning by sulfur compounds and tend to promote production of carbonaceous materials which deposit as a film around the catalysts and render them inactive. Other types of catalysts promote dehydrogenation reactions rather than cracking, and as a consequence the character of the gases and the antiknock properties of the gasoline produced are considerably different from those produced according to the present invention.

In one specific embodiment the present invention comprises a method for converting hydrocarbon fractions containing substantially no gasoline into high yields of gasoline and gases containing polymerizable olefins, by contacting said fractions with specially prepared silica-alumina composites, in successive conversion stages, the temperature being increased in succeeding stages so as to produce substantial catalytic conversion, separating the gasoline and gas between stages, polymerizing the olefins from said gaseous fractions, and passing controlled portions of the unconverted gases from the polymerization step to any or all conversion stages.

Although our present process may have more or less applicability when using various types of recognized cracking catalysts such as those which may be produced by the acid, or other chemical treatment of naturally occurring clays, the preferred catalyst comprises specially prepared synthetic masses, for example, silica-alumina, silica-zirconia, silica-alumina-zirconia, and silica-alumina-thoria having a very high degree of activity. These masses are prepared by combining the constituents in various ways such as mixing, co-precipitation and the like under conditions whereby alkali metal ions are excluded. In these catalysts the ratio of the components may vary within wide limits and the masses may be considered to comprise intimate or possibly molecular admixtures, all of the components indicating more or less low activity individually but in the aggregate displaying high activity. The activity also is not an additive function of the individual component, it being relatively constant for a wide range of proportions whether in molecular, or fractions of molecular proportions. It appears that no one component can be determined as the one component for which the remaining components may be considered as the promoter according to conventional terminology. In the present invention these catalysts are used in the form of sized particles or other formed shapes such as pellets produced by compression or extrusion methods. The pressed composites after drying and forming into definite shapes are calcined at temperatures above 800° F. prior to contacting with the hydrocarbons. The character of the catalysts produced as above described may vary depending upon the exact method of preparation and on the composition used. All of them have been found to have good catalytic activity, although they are not exactly equivalent in this respect. Some catalysts may be useful for the conversion of naphthas or reforming of gasolines, others more efficient for the cracking of gasoline, and still others for the conversion of high boiling distillates. Such catalysts have been found to accelerate the cracking of heavy petroleum distillates and other hydrocarbonaceous distillates to increase the yields of high octane number motor fuels, as well as the yields of polymerizable olefins which are readily converted to high octane number motor fuel. These particular catalysts have been found to be selective in bringing about the reactions resulting in the production of premium quality gasoline, and at the same time are of such a character that they stand up under severe handling, as well as successive periods of operation and regeneration. They are further characterized by the ease and accuracy with which they may be reproduced.

The removal of the alkali metal ions is of particular importance, since the presence of these ions causes certain undesirable side reactions to occur resulting in a substantial decrease in catalytic selectivity and activity. This may possibly be caused by reactions resulting in a decrease in the surface and porosity of the catalysts at the elevated temperatures at which they are used thus resulting in reduction of the catalytic activity to an extent such that the predominant reaction is no longer catalytic in character. It may also be possible that other reactions of an unknown character are catalyzed by alkali metal components which may account for the observed detrimental effects. Whatever the explanation we have observed that the removal of alkali metal compounds is of primary importance and our preferred catalysts are of this nature. Under certain circumstances it may be desirable to use catalysts of different composition in the different conversion stage of our process, although from a practical standpoint this is not usually the case.

It is known that certain stocks require somewhat different conditions of cracking, depending upon boiling range and the character of the crude oils from which they are derived.

In addition to this it has been found that the unconverted portion of the original charging stock remaining after conversion and separation of gasoline and gas, is of a more refractory nature than the virgin stock. The refractory character of the unconverted oil cannot be entirely attributed to any great change in its characteristics as obtained by superficial examination. Nevertheless, it has been found that when the unconverted bottoms are treated under the same conditions as the virgin oil, the conversion per pass is decreased. We have found that this per pass yield can be materially increased by increasing the temperature and decreasing the space velocity of the unconverted oil while charging it to a fresh body of the catalytic material after removal of the gasoline. This principle has been applied to the catalytic cracking process whereby the distillate is cracked and the gasoline and gas separated between each stage and the temperature conditions increased in each successive stage so as to produce the maximum yield of gasoline and gas. The exact conditions for optimum conversion of any type of oil cannot be specified exactly, but must be established as a result of examination of the oil and actual trial under the operating conditions.

We have already found that it is advantageous to pass a portion of the gases formed in the process back to any or all of the conversion stages. Various methods of accomplishing this are described in our copending application Serial No. 250,797, filed January 13, 1939. We have discovered a still better method of operation from the standpoint of yields and quality of product produced and this is the subject of our present invention.

The gases produced in the catalytic cracking steps are particularly rich in olefinic hydrocarbons which are capable of being polymerized by solid phosphoric acid catalyst or sulfuric acid or other catalytic as well as thermal polymerization processes which convert the low boiling, normally gaseous olefins into polymers boiling largely within the limits of the gasoline range. When recycling the process gases from each catalytic cracking stage to the catalytic converters, it has been found that the yield of gasoline increases and the exact reason for this is not known. Appreciably greater conversion can be obtained by passing the process gases from the conversion stages through a polymerization process, for example, the so-called solid phosphoric acid process, the sulfuric acid process, or thermal polymerization processes, whereby the olefins are removed from the gases by conversion to materials boiling in the motor fuel range. A controlled portion of the residual, substantially saturated, gases are then recirculated to the various conversion stages.

The solid phosphoric acid process employs a catalyst which comprises a composite consisting of a mixture of a major portion of phosphoric acid with kieselguhr or similar suitable siliceous material. The finely divided kieselguhr is made into a paste with the liquid phosphoric acid and is usually extruded and cut into cylindrical or annular shapes which are dried and calcined at temperatures of about 300° C. The mixture contains some $H_4P_2O_7$ and silicophosphates. In the so-called non-selective process, polymerization is carried out at temperatures of about 350° to 450° F. and pressures of 150 and 550 pounds per square inch. In the so-called selective process in which the gases are first fractionated and the butene-butane fraction polymerized, the temperature range is roughly 275° to 325° F. under pressures of 550 pounds and up. The time factor is increased as well. When the term "solid phosphoric acid" is used it is to be interpreted in the light of the above explanation.

The sulfuric acid process uses the polymerizing effect of sulfuric acid either at 65°–125° F. in the cold process or at temperatures up to 250° F. in the hot process. The acid concentrations are 60% and higher of $H_2SO_4$.

Thermal polymerization is carried out at high temperatures and pressures, namely 900°–1100° F. and higher, and 1000 to 2000 pounds per square inch pressure.

The attached drawing exemplifies one method of carrying out our process, although the invention should not be interpreted as limited to the exact apparatus or flows therein indicated. The drawing has not been made to scale.

The hydrocarbon distillate enters the process through line 1 and valve 2 and is passed by means of pump 3 through line 4 and valve 4' into furnace 5 where the temperature is raised to slightly above that desired in the first catalytic cracking stage. The vaporized oil is passed through line 6 and valve 7 into catalytic converter 8 where the initial cracking occurs. The reaction products together with unconverted oil pass through line 9 and valve 10 to separator 11. The gasoline produced passes through line 14, valve 15 and condensers not shown to the common gasoline run-down line 16 through which it goes to storage. The gases pass through line 12, valve 12' and gas line 13 and valve 46 to gas holder 46' and thence through valve 46'' and line 13', pump 76 and valve 76' to the polymerizer 47. The unconverted oil from separator 11 passes through line 17 and valve 18 and is pumped by means of pump 19 through valve 20 into furnace 21 where the temperature is increased to a desired point substantially higher than in furnace 5. The oil passes through line 22 and valve 23 into converter 24 where further conversion into gasoline and gas occurs. The reaction products pass through line 25 and valve 26 into separator 27 from which the gasoline is taken by means of line 29 and valve 30 into gasoline run-down line 16. The gases pass through line 28 and valve 28' to gas line 13 where they mingle with the gases from the first conversion stage. The unconverted bottoms pass from separator 27 through line 31, valve 32, pump 33 and valve 34 to furnace 35 where the temperature is increased to a point substantially greater than in converter 24. The oil passes through line 36 and valve 37 into the third catalytic converter 38 where additional conversion to gasoline and gas occurs. The reaction products together with unconverted oil pass through line 39 and valve 40 into separator 41. The gasoline passes through line 42 and valve 43 to the gasoline run-down line 16. The gases pass through line 44 and valve 44' to the main gas line 13. The unconverted oil from separator 41 may be converted still further to gasoline and gas providing the quantity is such to warrant installation of another converter. However, this is not usually the case and the unconverted gas oil is generally drawn through line 45, line 45' and valve 45'' to storage.

A preferable alternative is to return a major portion of the unconverted oil to the third conversion stage. This is done by passing the oil through line 74 and valve 75 where it mingles with the unconverted bottoms from the second conversion stage in line 31 and is pumped by previously described routes through furnace 35 to converter 38. In this case a portion of the oil may be drawn through line 45' and valve 45'' to storage as previously described.

The combined gases from all of the conversion stages are pumped by compressor 76 into polymerizer 47 where the polymerizable olefins are converted into material boiling within the gasoline range. The reaction products pass through line 48 and valve 49 into fractionator 50. The polymers boiling in the gasoline range are removed through line 68 and valve 69 to storage. The residual gases which consist mainly of hydrogen, saturated hydrocarbons and some ethylene, are removed through line 51 and valve 52 and may pass through line 62 and valve 63 to line 61 and be returned by pump 61' to the various catalytic conversion stages by means of the extension of line 61 and lines 77 and 78 containing valves 79, 80 and 81, respectively.

Another method of operation is to pass the gases from line 51 into debutanizer 54 by means of line 53 and valve 53' where the butane is removed through line 64 and valve 65 and line 66 to storage where it may be used for increasing the vapor pressure of higher boiling gasoline, or, alternatively, the butane from line 64 may be passed through valve 67 to line 61 where it is returned by previously described methods to the first, second and third catalytic conversion stages. In this case low boiling gases are drawn through line 55, valve 56, valve 57 and line 58 to gas disposal. Another method of operation is to remove the butane to storage as described and to pass the hydrocarbons of lower boiling point than butane from debutanizer 54 through line 55 and valve 56, valve 59 and line 60 into line 61 from which it is distributed to the conversion stages. It is usually preferred to return the unconverted gases from the polymerization step without separation into components to the catalytic conversion zones but in order to make the operation more flexible and to meet the demands of refiners who might have use for a portion of the gases, such as, for example, the butane, the alternative flows have been introduced.

The high boiling polymers which are formed in the polymerization step may be separated in fractionator 50 and withdrawn from the system through line 70, valve 73 and line 73' or alternatively may be passed through valve 71 and line 72 to line 1 where it is returned by previously described means to the first catalytic conversion stage. Lines 17' and 31' and valves 17'' and 31'' may be used for draining separators 11 and 27.

In carrying out the operation of our process we prefer to maintain the first catalytic converter at temperatures of 800°–975° F., the second at temperatures of 950°–1100° F. and the third at temperatures of 1050°–1200° F., since it has been found that the optimum catalytic conversion of the stocks going to each stage occurs in these ranges.

The separators 11, 27 and 41 may suitably consist of a fractionator for the separation of unconverted bottoms from the gasoline and gas followed by a stabilizer for the separation of the gasoline from the gas. However, in the interests of simplification, the separator is shown as a single vessel. Furthermore, the converter 47 has not been shown in its entirety and would naturally require the addition of various heaters, temperature controllers and the like, which are essential to the operation of such a plant but are not novel parts of the present invention. Likewise, heat exchangers and coolers for the various products, such as condensers for the gasoline, are not shown in the interests of making the drawing as simple as possible.

The amount of gas recirculated to any stage cannot be predicted since this will depend entirely upon the conditions employed and the stock under consideration. Another factor entering into this may be the type of apparatus used. It has been found, however, that it is oftentimes desirable to use relatively larger amounts of gas in each succeeding stage, and that when higher temperatures are employed the molecular ratio of gas to liquid charge may likewise be suitably increased.

A possible explanation of the beneficial results obtained is based upon the fact that reductions in pressure during catalytic cracking have been found to be beneficial and the gas would have the effect of reducing the partial pressure of the oil which should be equivalent to reducing the cracking pressure thus improving the yields obtainable on a once-through basis. It should be borne in mind that these explanations are in the nature of conjecture and that we do not limit ourselves to them in any way, but propose to rest our invention upon the fact that improved results are obtained by the methods described.

The term "unconverted oil or bottoms" is understood to refer to that portion of the oil of higher than gasoline boiling range which remains after passage through the catalytic converters.

When the term "substantially atmospheric pressure" is used it is to be understood that sufficient pressure differential exists between the inlet and outlet of any portion of the apparatus as to permit the flow of liquid or vapor through said apparatus.

The following example is given to illustrate the usefulness and possibilities of our process, but is not intended to limit the process to the exact conditions described therein:

*Example*

As an example of our process a Pennsylvania gas oil of 37.1° A. P. I. gravity was converted into gasoline and gas and a minor quantity of unconverted oil having the boiling range, gravity and other properties suitable for a domestic fuel oil in the following manner: The virgin oil was passed over a silica-alumina cracking catalyst which was prepared by the coprecipitation of silica and alumina followed by treating with ammonium chloride and water for the removal of alkali metal compounds, shaped into pills and calcined at 1000° F. The gas oil was then treated in the manner described in the foregoing description of the flow apparatus, the first converter being operated at 932° F., the second at 1022° F. and the third at 1130° F. The gas from the solid phosphoric acid polymerization plant fractionator was returned in equal volume to each of the conversion zones. Since the volume of oil being processed in each succeeding zone was smaller, the ratio of gas to distillate was greater in each succeeding zone. A major part of the unconverted bottoms from the third catalytic conversion stage were returned to the furnace and the third converter for further cracking. The polymers of higher than gasoline boiling range from the fractionator on the catalytic polymerization plant were returned to the first catalytic conversion stage where they were converted into gasoline and gas. A total of 86% by volume of 81 octane number gasoline was obtained.

We claim as our invention:

1. A conversion process which comprises subjecting hydrocarbon oil to catalytic cracking in a series of conversion stages maintained at successively higher cracking temperatures, separating gas, gasoline and bottoms after each conversion stage and passing separated bottoms from a preceding to a succeeding stage, combining gases separated from the successive stages and subjecting the resultant mixture to polymerization to convert gaseous olefins into polymer liquid, separating the latter from residual gases and introducing separate portions of the last-named gases to said conversion stages.

2. A conversion process which comprises subjecting hydrocarbon oil to catalytic cracking in a series of conversion stages maintained at successively higher cracking temperatures, separating gas, gasoline and bottoms after each conversion stage and passing separated bottoms from a preceding to a succeeding stage, combining gases separated from the successive stages and subjecting the resultant mixture to polymerization to convert gaseous olefins into normally liquid polymers, fractionating the resultant products to separate gasoline boiling polymers, heavier polymers and residual gases, supplying the heavier polymers to the first conversion stage of the series, and introducing a separate portion of said residual gases to each of said conversion stages.

3. A conversion process which comprises subjecting hydrocarbon oil to catalytic cracking in a series of conversion stages maintained at successively higher cracking temperatures, separating gas, gasoline and bottoms after each conversion stage and passing separated bottoms from a preceding to a succeeding stage, combining gases separated from the successive stages and subjecting the resultant mixture to polymerization to convert gaseous olefins into polymer liquid, separating the latter from residual gases and introducing separate portions of the last-named gases to said conversion stages, the ratio of gas to oil in the successive stages increasing in the direction of flow of said bottoms through the stages.

4. A conversion process which comprises subjecting hydrocarbon oil to catalytic cracking in a series of conversion stages maintained at successively higher cracking temperatures, separating gas, gasoline and bottoms after each conversion stage and passing separated bottoms from a preceding to a succeeding stage, combining gases separated from the successive stages and subjecting the resultant mixture to polymerization to convert gaseous olefins into polymer liquid, separating the latter from residual gases and introducing substantially equal volumes of the last-named gases to said conversion stages whereby the ratio of gas to oil increases from stage to stage.

GUSTAV EGLOFF.
CHARLES L. THOMAS.